(12) United States Patent
Vanderlip et al.

(10) Patent No.: US 8,802,222 B2
(45) Date of Patent: Aug. 12, 2014

(54) ACRYLATED NATURAL OIL COMPOSITIONS

(71) Applicant: Allnex Belgium S.A., Brussells (BE)

(72) Inventors: Jeff Vanderlip, Marietta, GA (US);
Karen Shuler, Calhoun, GA (US);
Rosalyn Waldo, Woodstock, GA (US);
Thierry Randoux, Braine l'Alleud (BE)

(73) Assignee: Allnex Belgium S.A., Brussels (BE)

( * ) Notice: Subject to any disclaimer, the term of this patent is extended or adjusted under 35 U.S.C. 154(b) by 0 days.

(21) Appl. No.: 13/955,360

(22) Filed: Jul. 31, 2013

(65) Prior Publication Data

US 2013/0309459 A1    Nov. 21, 2013

Related U.S. Application Data

(62) Division of application No. 12/668,142, filed as application No. PCT/EP2008/058564 on Jul. 3, 2008, now Pat. No. 8,524,354.

(60) Provisional application No. 60/929,788, filed on Jul. 12, 2007.

(51) Int. Cl.
| | |
|---|---|
| C08F 2/46 | (2006.01) |
| C09D 11/06 | (2006.01) |
| C07C 51/00 | (2006.01) |
| C08L 51/08 | (2006.01) |
| C09D 151/08 | (2006.01) |
| C08F 267/00 | (2006.01) |
| C08F 265/00 | (2006.01) |
| C08F 289/00 | (2006.01) |
| C08K 5/092 | (2006.01) |

(52) U.S. Cl.
CPC .............. C08K 5/092 (2013.01); C08L 51/08 (2013.01); C09D 151/08 (2013.01); C08F 267/00 (2013.01); C08F 265/00 (2013.01); C08F 289/00 (2013.01)
USPC ......... 428/195.1; 427/504; 427/511; 554/127

(58) Field of Classification Search
None
See application file for complete search history.

(56) References Cited

U.S. PATENT DOCUMENTS

| | | | | |
|---|---|---|---|---|
| 3,287,292 A | * | 11/1966 | Dalibor | ............................. 525/7 |
| 3,673,140 A | | 6/1972 | Ackerman et al. | |
| 3,989,609 A | | 11/1976 | Brack | |
| 4,119,640 A | | 10/1978 | Hodakowski et al. | |
| 4,233,130 A | | 11/1980 | Borden et al. | |
| 2006/0079607 A1 | | 4/2006 | Balmer et al. | |

FOREIGN PATENT DOCUMENTS

| | | |
|---|---|---|
| GB | 603952 | 6/1948 |
| GB | 792466 | 3/1958 |
| GB | 1158718 | 7/1969 |

OTHER PUBLICATIONS

International Search Report for PCT/EP2008/058564.
Machine Translation of Description of DE 39 38 149 A (May 23, 1991).
English Abstract of JP 58042612 A (Mar. 1983).
Derwent abstract of DE 3938149A (May 1991).
English Abstract of JP 08333426 (Dec. 1996).
English Abstract of JP 50083318 (Jul. 1975).
English Abstract of JP 50124711 (Oct. 1975).
English Abstract of JP 52021903 (Feb. 1977).
English Abstract of JP 56112919 (Sep. 1981).
English Abstract of JP 59047215 (Mar. 1984).

* cited by examiner

*Primary Examiner* — Vu A Nguyen
(74) *Attorney, Agent, or Firm* — Wenderoth, Lind & Ponack, L.L.P.

(57) ABSTRACT

The present invention relates to a radiation curable composition comprising (a) from 1 to 99% by weight of a (meth)acrylated natural oil which is the reaction product of an unsaturated natural oil with an unsaturated anhydride and a hydroxyl functional (meth)acrylate, and (b) from 1 to 99% by weight of a (meth)acrylated oligomer and/or monomer, and optionally an inert resin and/or filler, as well as their use for making inks and coatings.

15 Claims, No Drawings

ACRYLATED NATURAL OIL COMPOSITIONS

This invention relates to new radiation curable compositions, especially to new radiation curable compositions comprising natural oil derivatives which are particularly suitable for making inks for different ink printing processes. The invention further relates to new (meth)acrylated natural oils. Radiation curable inks based on acrylated epoxidized natural oils such as soybean oil have already been described in U.S. Pat. No. 4,233,130, as well as in U.S. 2006/0079607. Acrylates of epoxidized natural oils such as soybean oil generally have a relative high viscosity. Hence in order to make these materials suitable for applying coatings or for making inks, they need to be diluted with solvents or with relatively large amounts of monomers. Moreover many of these materials still have problems with stability.

We now have found new radiation curable compositions which do not present these drawbacks. The present invention therefore relates to a radiation curable composition comprising (a) from 1 to 99% by weight of a (meth)acrylated natural oil which is the reaction product of an unsaturated natural oil with an unsaturated anhydride and a hydroxyl functional (meth)acrylate, and (b) from 1 to 99% by weight of a (meth)acrylated oligomer and/or monomer.

In the present invention, the term "(meth)acryl" is to be understood as to encompass both acryl and methacryl compounds or derivatives as well as mixtures thereof.

By unsaturated natural oil is meant to designate in the present invention any naturally occurring oil which comprises at least one carbon-carbon double bond. Examples of natural oils include soybean oil, linseed oil, perilla oil, fish oil, dehydrated castor oil, tung oil, coconut oil, corn oil, cottonseed oil, olive oil, palm oil, palm kernel oil, peanut oil, sunflower oil, safflower oil. Combination of oils may be used. Linseed oil, soybean oil or their mixtures are preferred.

By unsaturated anhydride is meant to designate an anhydride that contains at least one carbon-carbon double bond. Maleic anhydride is preferred.

By hydroxyl functional (meth)acrylate is understood as a compound comprising at least one hydroxyl group and at least one (meth)acryl group. Compounds comprising one hydroxyl group are preferred. Compounds comprising from 1 to 10 (meth)acryl groups are preferred, especially those comprising from 1 to 6 (meth)acryl groups. Hydroxy alkyl(meth)acrylates are particularly suitable, especially those comprising from 2 to 20 carbon atoms in the alkyl moiety. Acrylates are particularly preferred. Most preferred are 2-hydroxethylacrylate, 2-hydroxypropylacrylate and 3-hydroxypropylacrylate.

According to a first specific embodiment of the invention, hydroxyl functional (methacrylates) comprising more than 1 (meth)acryl groups have been used. Preferred are poly(meth)acryloyl mono-hydroxy compounds. Acrylates are particularly preferred. Useful compounds include the esterification products of aliphatic and/or aromatic polyols with (meth)acrylic acid having a residual average hydroxyl functionality of about 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. These modified or unmodified polyols are partly esterified with acrylic acid, methacrylic acid or mixtures thereof until the desired residual hydroxyl functionality is reached. Examples of compounds comprising at least two (meth)acryl functions are as glycerol diacrylate, trimethylolpropane diacrylate, pentaerythritol triacrylate, ditrimethylolpropane triacrylate, dipentaerythritol pentaacrylate and their (poly)ethoxylated and/or (poly)propoxylated equivalents. The use of these compounds permit to obtain (meth)acrylated natural oils having a higher reactivity than those obtained with hydroxyethylacrylate or hydroxypropyl acrylate.

The present invention therefore further relates to a (meth)acrylated natural oil which is the reaction product of an unsaturated natural oil with an unsaturated anhydride and a hydroxyl functional (meth)acrylate comprising at least 2 (meth)acryl groups. The hydroxyl functional (meth)acrylate comprising at least 2 (meth)acryl groups preferably is a mono-hydroxy poly(meth)acrylated comprising at least 2, more preferably at least 3, (meth)acryl groups. The hydroxyl functional (meth)acrylate comprising at least 2 (meth)acryl groups preferably comprises not more than 6 (meth)acryl groups.

According to a second embodiment of the invention, a hydroxyl functional (meth)acrylate which is the reaction product of an hydroxyalkyl(meth)acrylate with a lactone and/or an alkylene oxide is used. Particularly preferred are the reaction products of hydroxyethyl(meth)acrylate with ε-caprolactone, ethylene oxide and/or propylene oxide. Such products are for example commercialized under the name of TONE®M 100, Bisomer®PEM6 LD, Bisomer®PPA6 and Bisomer®PEM63P HD. The use of these compounds permit to obtain (meth)acrylated natural oils providing higher flexibility products.

The present invention therefore further relates to a (meth)acrylated natural oil which is the reaction product of an unsaturated natural oil with an unsaturated anhydride and a hydroxyl functional (meth)acrylate which is the reaction product of an hydroxyalkyl(meth)acrylate with a lactone and/or an alkylene oxide.

According to third and preferred embodiment of the invention, hydroxyl functional (methacrylates) comprising a secondary hydroxyl group is used. Preferred are compounds comprising one secondary hydroxyl group and no other hydroxyl groups. Preferred are compounds comprising an aliphatic and/or aromatic hydrocarbon chain comprising at least 4 carbon atoms. Particularly preferred are compounds of formula (I) and (II)

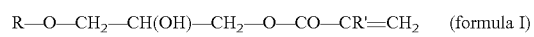
R—O—CH$_2$—CH(OH)—CH$_2$—O—CO—CR'=CH$_2$     (formula I)

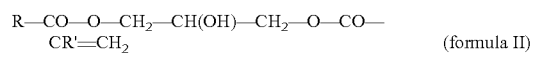
R—CO—O—CH$_2$—CH(OH)—CH$_2$—O—CO—CR'=CH$_2$     (formula II)

wherein R' is H or —CH$_3$ and R=an alkyl or aryl, generally comprising from 4 to 20, preferably from 8 to 16 carbon atoms. These compounds can be obtained from the reaction of glycidyl(meth)acrylate with alkanoic acids or from the reaction of glycidyl esters or ethers with (meth)acrylic acid.

Examples of such compounds are the (meth)acrylate esters of the glycidyl ester of neodecanoic acid (also known as the (meth)acrylate of Cardura®E-10P), the (meth)acrylate esters of butyl glycidyl ether, the (meth)acrylate esters of cresyl glycidyl ether, the (meth)acrylate esters of phenyl glycidyl ether, the (meth)acrylate esters of nonylphenyl glycidyl ether, the (meth)acrylate esters of p-tert-butylphenyl glycidyl ether, the (meth)acrylate esters of 2-ethylhexyl glycidyl ether, the (meth)acrylate esters of C$_{8-10}$ alkyl glycidyl ethers, the (meth)

acrylate esters of $C_{12-14}$ alkyl glycidyl ethers. Preferred are aliphatic compounds. Examples of such compounds are those commercialized under the name of EBECRYL®111, EBECRYL®112 and EBECRYL®113.

Particularly preferred are the (meth)acrylate esters of the glycidyl ester of neodecanoic acid and the (meth)acrylate esters of $C_{8-10}$ alkyl glycidyl ethers, the (meth)acrylate esters of $C_{12-14}$ alkyl glycidyl ethers.

The use of these hydroxyl functional (methacrylates) comprising a secondary hydroxyl group permits to obtain (meth) acrylated natural oils which have a low viscosity as well as a low toxicity when compared to (meth)acrylated natural oils obtained with 2-hydroxyethylacrylate.

The present invention therefore further relates to a (meth) acrylated natural oil which is the reaction product of an unsaturated natural oil with an unsaturated anhydride and a hydroxyl functional (meth)acrylate comprising a secondary hydroxyl group, preferably those comprising one secondary hydroxyl group and no other hydroxyl groups, more preferably those of formula (I) and (II).

The (meth)acrylated natural oil used in the composition according to the present invention preferably has a viscosity, measured at 25° C. according to ASTM method D-2393-80, of from 500 to 50000 cps, preferably from 1000 to 10000 cps.

The (meth)acrylated natural oil used in the composition according to the present invention preferably has an acid value, measured according ASTM 1639-70, of from 25 to 200 mg KOH/g, preferably from 50 to 100 mg KOH/g.

The (meth)acrylated natural oil is generally obtained by a process wherein in a first step, the unsaturated natural oil is reacted with the unsaturated anhydride, followed by a subsequent step wherein the anhydride modified natural oil is reacted with the hydroxyl functional (meth)acrylate.

The relative quantities of unsaturated anhydride and unsaturated natural oil used in the preparation of the anhydride modified natural oil are preferably from 1 to 6 moles of unsaturated anhydride per mole of unsaturated natural oil. More preferably this ratio is from 1.5 to 2.5 moles per mole.

The reaction of the unsaturated natural oil with the unsaturated anhydride is generally conducted at a temperature of 180 to 250° C., preferably around 200° C.

The relative quantities of anhydride modified natural oil and hydroxyl functional (meth)acrylate used in the subsequent step of the reaction are generally from 0.5 to 1.5 moles, preferably from 0.95 to 1.05 moles, of hydroxyl functional (meth)acrylate per equivalent anhydride group present in the anhydride modified natural oil.

The reaction of the anhydride modified oil with the hydroxyl functional (meth)acrylate is generally conducted at a temperature of 90 to 120° C., preferably from 100 to 110° C. This reaction is preferably done in the presence of a free radical inhibitor.

The reaction is preferably done in the presence of a catalyst accelerating the anhydride ring opening reaction.

The radiation curable composition according to the present invention preferably comprises at least 10% by weight of (meth)acrylated natural oil, more preferably at least 20% by weight. The quantity of (meth)acrylated natural oil does preferably not exceed 80% by weight of the radiation curable composition.

By (meth)acrylated oligomer is meant to designate in the present invention compounds having an average molecular weight of from 250 to 25000 and having at the chain ends or laterally along the chains, at least one, preferably at least two, (meth)acryl groups. The average molecular weight of the (meth)acrylated oligomer preferably does not exceed 10000, more preferably not 4000.

When the compositions are used for making varnishes, especially overprint varnishes, the (meth)acrylated oligomer used in the composition according to the invention, preferably has a viscosity, measured at 25° C. according to ASTM method D-2393-80, of 300000 to 1000000, more preferably from 600000 to 1000000, cps.

When the compositions are used for making UV-litho inks, the (meth)acrylated oligomer used in the composition according to the invention, preferably has a viscosity, measured at 25° C. according to ASTM method D-2393-80, of 400 to 125000, more preferably from 400 to 75000, most preferably from 400 to 36000, cps.

When the compositions are used for making UV-litho inks, preferred (meth)acrylated oligomers are those known as presenting a low oligomer tack and/or a good pigment wetting.

The (meth)acrylated oligomers are generally selected from the group of polyester (meth)acrylates, polyether (meth)acrylates, epoxy(meth)acrylates, polycarbonate (meth)acrylates, urethane (meth)acrylates, (meth)acrylated (meth)acrylates, amine(meth)acrylates and any combination thereof.

Polyester (meth)acrylates are well known. These (meth) acrylated polyesters can be obtained by reacting a hydroxyl group-containing polyester backbone with (meth)acrylic acid, or by reacting a carboxyl group-containing polyester backbone with a hydroxyalkyl(meth)acrylate such as for example 2-hydroxyethyl acrylate, 2- or 3-hydroxypropyl acrylate, etc. or with glycidyl methacrylate. The polyester backbone can be obtained in a conventional manner by polycondensation of at least one mono- and/or polyhydroxy alcohol, such as ethylene glycol, propylene glycol, butanediol, neopentyl glycol, hexanediol, trimethylolpropane, bisphenol A, pentaerythritol, etc, or/and the ethoxylates and/or propoxylates thereof, with at least one mono- and/or polycarboxylic acid such as adipic acid, phthalic acid, isophthalic acid, terephthalic acid, trimellitic acid, etc. By using unsaturated compounds for the polyester synthesis, such as for example fumaric acid, maleic acid, itaconic acid, etc., polyesters bearing both (meth)acrylic and ethylenic unsaturations in the polymer chain, can be obtained. In addition polylactones can be used as polyester backbone. For example poly (ε-caprolactone) obtained by ring-opening polymerization of ε-caprolactone, optionally in the presence of one or more polyhydroxy alcohol, can be used. Preferred are the polyester (meth)acrylates commercialized as EBECRYL®810, EBECRYL®870 and EBECRYL®885.

Polyether(meth)acrylates are known: they can be prepared by esterification of hydroxyfunctional polyethers with (meth) acrylic acid. Hydroxyfunctional polyethers can be obtained by ring-opening homo- or copolymerization of cyclic ethers such as tetrahydrofuran, ethylene oxide and/or propylene oxide or can be prepared by reacting polyhydroxy alcohols with ethylene and/or propylene oxide.

Polycarbonate (meth)acrylates are known. They can be prepared by esterification of hydroxyfunctional polycarbonates with (meth)acrylic acid.

Urethane (meth)acrylates are known as well. Urethane (meth)acrylates can be prepared by reacting a di- and/or polyisocyanate, such as hexamethylene-diisocyanate, isophorone-diisocyanate, toluene-diisocyanate, with an hydroxyl functional (meth)acrylate. Use can be made exclusively of hydroxyl functional (meth)acrylates such as those mentioned above, but in order to extend the chain, mono- or polyhydroxy alcohols can also be added, such as those mentioned above for the synthesis of polyesters and/or polyesters, polyethers or polycarbonates containing hydroxyl groups can be added to provide, respectively, polyester urethanes, polyether urethanes, polycarbonate urethanes containing (meth)acrylic unsaturations.

Preferably, the urethane(meth)acrylates have a molecular weight of less than 5,000.

Most preferred are urethane acrylates commercialized as EBECRYL®270, EBECRYL®4883 and EBECRYL®8402.

By epoxy(meth)acrylates is meant to designated the (meth) acrylic esters of epoxides, preferably polyepoxides, i.e. compounds comprising at least one, preferably at least two epoxide functions. Epoxy(meth)acrylates are generally obtained from the esterification reaction of (meth)acrylic acid with epoxides. The epoxides are generally chosen from glycidyl ethers of aromatic or aliphatic alcohols, polyols and from cycloaliphatic polyepoxides. Preferred epoxides are diglycidylethers of aromatic and aliphatic diols and cycloaliphatic diepoxides, such as diglycidyl ether of bisphenol-A, diglycidyl ether of bisphenol-F, diglycidylether of poly(ethylene oxide-co-propylene oxide), diglycidylether of polypropylene oxide, diglycidylether of hexanediol, diglycidylether of butanediol. Particularly preferred is diglycidyl ether of bisphenol-A. Also epoxidized unsaturated fatty acid triglycerides or epoxidized novolacs can be used. Examples include epoxidized soya oil tri- and tetraacrylate, epoxidized castor oil triacrylate, epoxidized linseed oil tetra- and pentaacrylate, epoxidized tung (or China wood) oil tetra- and pentaacrylate.

(Meth)acrylic (meth)acrylates can be obtained by first preparing a (meth)acrylic copolymer by copolymerization of (meth)acrylic monomers such as butyl acrylate, 2-ethylhexyl acrylate and methyl methacrylate with monomers containing pendant acid, anhydride, hydroxy or glycidyl groups and by then reacting this copolymer with an unsaturated monomer. For example, a glycidyl group-containing copolymer can first be prepared by copolymerizing functionalized monomers such as glycidyl(meth)acrylate with other (meth)acrylic monomers, the said glycidyl group-containing polymer being usually reacted in a second step with (meth)acrylic acid. When the functionalized monomers are (meth)acrylic acid, the carboxyl group-containing polymer is generally reacted in the second step with glycidyl(meth)acrylate.

The radiation curable composition according to the present invention preferably comprises at least 10% by weight of (meth)acrylated oligomer, more preferably at least 20% by weight. The quantity of acrylated oligomer does generally not exceed 60%, preferably not 50%, more preferably not 35%, by weight of the radiation curable composition.

The radiation curable composition can also contain lower molecular weight (meth)acrylated monomers such as (meth) acrylic acid, beta-carboxyethyl acrylate, butyl(meth)acrylate, methyl(meth)acrylate, isobutyl(meth)acrylate, 2-ethylhexyl (meth)acrylate, cyclohexyl(meth)acrylate, n-hexyl(meth) acrylate, isobornyl(meth)acrylate, isooctyl(meth)acrylate, n-lauryl(meth)acrylate, octyl/decyl(meth)acrylate, 2-hydroxyethyl(meth)acrylate, phenoxyethyl(meth)acrylate, nonylphenolethoxylate mono(meth)acrylate, 2-(-2-ethoxyethoxy)ethyl(meth)acrylate, 2-butoxyethyl(meth)acrylate, cardura (meth)acrylate, N-vinyl pyrrolidone, 1,6-hexanediol diacrylate (HDDA), di or tri propylene glycol diacrylate (DPGDA, TPGDA), ethoxylated and/or propoxylated neopentylglycoldi(meth)acrylate, pentaerythritoltriacrylate (PETIA) and the ethoxylated and/or propoxylated derivates thereof, trimethylolpropanetri(meth)acrylate (TMPTA) and the ethoxylated and/or propoxylated derivates thereof, di-trimethylolpropanetri(meth)acrylate (diTMPTA) glyceroltri (meth)acrylate and the ethoxylated and/or propoxylated derivates thereof, bisphenol A di(meth)acrylate and the ethoxylated and/or propoxylated derivatives thereof, phenylglycidylether(meth)acrylate and the ethoxylated or/and propoxylated derivatives thereof.

If low molecular weight monomers are present in the composition according to the invention, their quantity is usually from 0 to 60%, preferably from 0 to 40%, more preferably from 0 to 20%, by weight.

The radiation curable composition used in the process according to the invention usually also contains at least one inhibitor. Inhibitors include without limitation hydroquinone, methyl hydroquinone (THQ), monomethyl ether of hydroquinone (MEHQ), tert-butyl hydroquinone, di-tert-butyl hydroquinone, 2,6-di-tert-butyl-4-methylphenol (BHT), phenothiazine (PTZ), triphenyl antimony (TPS), oxalic acid and any mixtures thereof.

The total amount of inhibitor used is generally from 0 to 1% by weight, preferably from 0.01 to 0.5% by weight.

The radiation curable composition may also contain one or more adhesion promotors. The amount of adhesion promotors is generally from 0 to 20% by weight. Preferably an amount of 2 to 15% by weight of adhesion promotor is used. Preferred adhesion promoters are (meth)acrylated adhesion promoters such as EBECRYL®168, EBECRYL®170 and EBECRYL®171.

The radiation curable composition according to the invention may also comprise pigments, colorants, inert resins, fillers and/or other additives such as dispersing agents, surfactants, wetting agents, emulsifying agents, antioxidants, flow modification agents, slip agents, fire retardant agents, UV-protection agents. The total amount of pigments, colorants, inert resins, fillers and/or additives generally does not exceed 60% by weight, preferably it does not exceed 40% by weight.

According to a first specific embodiment, the radiation curable composition contains from 1 to 50%, preferably from 2 to 25%, more preferably from 5 to 20%, by weight at least one inert resin. By inert resin is meant to designate a compound which does not contain reactive groups, especially (meth)acrylic unsaturations, and which is generally compatible with and soluble in the composition. The inert resin may contain internal double bounds that substantially do not react with the (meth)acrylated groups during curing under irradiation.

Inert resins are generally selected from hydrocarbon resins, acrylic resins, polyesters, chlorinated polyesters, rosin esters, phenolic resins, polyamides, styrene allyl alcohol copolymers, alkyd resins, polydiallylphthalate resins, cetonic resins, plasticizers such as sucrose benzoate. The compositions according to the first specific embodiment are particularly suitable for being used in inks and overprint varnishes.

According to a second specific embodiment, the radiation curable composition contains from 1 to 50%, preferably from 2 to 40%, more preferably from 5 to 35%, by weight at least one filler. Preferred fillers are inorganic fillers, such as talc (magnesium silicate hydroxide), calcium carbonate, dolomite, gypsum, anhydrous sodium sulfate, glass and ceramic microspheres, mica, perlite, vermiculite, feldspar, kaolin (china clay), alumina oxide, silica, nepheline syenite (anhydrous sodium potassium aluminum silicate), chlorite (hydrous magnesium aluminum silicate), synthetic and natural barytes (barium sulphate), titanium dioxide, and wollastonite (calcium silicate).

Preferred inorganic fillers are talc and calcium carbonate.

The composition according to the invention can be prepared by any method. Generally the composition according to the invention is prepared by blending. Preferably the composition according to the invention is prepared by mixing the (meth)acrylated natural oil, optionally with the inert resin and/or filler, preferably at a temperature from room temperature to 120° C., followed by adding the (meth)acrylated oligomer and/or (meth)acrylated monomer, generally at a temperature from room temperature to less than 100° C.

The radiation curable composition may also comprise at least one photochemical initiator and/or chemical initiator, capable of initiating the polymerization of the radiation curable oligomer and optionally the other radiation curable compounds present therein. Photochemical initiators (also called photoinitiators) are compounds that can generate radicals by absorption of light, typically UV light. The photoinitiators are preferably free-radical photoinitiators.

When cured under UV-light, curable compositions comprising at least one photoinitiator are preferred. The amount of photoinitiator or chemical initiator in the composition is preferably comprised between 0.001 and 20 wt %, more preferably between 0.01 and 10 wt %. The composition according to the invention may also comprise from 0 to 5% by weight of one or more photosensitizers.

Alternatively, the composition can be cured in the absence of an initiator, especially by electron beam radiation.

The radiation curable compositions according to the invention present a good stability, especially when compared to acrylated products obtained from epoxidized natural oils.

The radiation curable compositions according to the invention present good adhesion after curing on several substrates, such as metal, paper, wood and plastics.

The radiation curable compositions according to the invention provides good pigment wetting.

The radiation curable compositions according to the invention show a unique combination of rheology, flexibility and adhesion which permits to obtain inks and coatings showing a good pigment wetting, low ink tack, low misting and good adhesion. By inks is meant to understand liquid inks as well as paste inks.

The present therefore also relates to a method for making coatings and inks comprising the steps of:
(a) providing a radiation curable composition as described here above,
(b) applying said composition onto a surface, and
(c) irradiating the surface with actinic radiation or electron beams.

In the method according to the invention, the compositions can be applied to the surface by any coating technique, including the spray, curtain, dip, pad and roll-coating techniques, as well as any printing technique such as lithography, letterpress, serigraphy, rotary screen, flexography, gravure and inkjet printing.

The substrate to be coated or printed can be any substrate, such as wood, metal, paper, plastic, fabric, fiber, ceramic, concrete, plaster, glass, etc.

The irradiation of the surface can be done by low energy electrons, actinic or UV radiation.

The composition according to the invention is particularly suitable for making inks and overprint varnishes. The invention therefore further relates to a method of printing comprising a least one step wherein a substrate is printed with an ink or varnish comprising a radiation curable composition and/or a (meth)acrylated natural oil according to invention, and curing the printed ink or varnish with actinic radiation or electron beams.

The printing can be done with any printing technology, especially with lithographic printing and flexographic printing. The compositions according to the invention are particularly suitable for making UV litho inks. These inks can be printed on UV litho sheetfed or web presses or as described in U.S. 2006/0079607 on coldest presses that have been modified to print UV inks.

The invention also relates to the entirely or partially coated or printed substrates obtained with a printing ink, varnish or coating material comprising a radiation curable composition and/or a (meth)acrylated natural oil according to the invention.

The following examples are submitted for a better understanding of the invention without being restricted thereto.

Example 1

520 g of Supreme Linseed Oil was reacted with 101.6 g of maleic anhydride at 200° C. under a $N_2$ atmosphere for 3.5 hours and then cooled down to 108° C. An air sparge was initiated and 0.76 g of MEHQ and 1.89 g of tris-2,4,6-(dimethylaminomethyl)phenol (Ankamine®K54) were added. Then, 120.3 g of 2-hydroxyethylacrylate were added over 40 minutes and the reaction was held at 108° C. for 4 hours and 40 minutes.

An acrylated maleated linseed oil having the following properties was obtained:
viscosity (at 25° C.) 7530 cps, acid value=67.1 mg KOH/g, total acid value (TAV, including acid functions provided by unreacted anhydride)=65.3 mg KOH/g.

Example 2

448.2 g of Supreme Linseed Oil was reacted with 87.5 g of maleic anhydride at 200° C. under a $N_2$ atmosphere for 3.5 hours and then cooled down to 108° C. An air sparge was initiated and 0.63 g of MEHQ and 1.6 g of Ankamine K54 were added. Then, 103.6 g of 2-hydroxyethylacrylate were added over 50 minutes and the reaction was held at 108° C. for 3 hours and 40 minutes.

An acrylated maleated linseed oil having the following properties was obtained:
viscosity (at 25° C.) 8570 cps, acid value=66, TAV=67.4, Color=9.5 Gardner.

Example 3

943.5 g of Supreme Linseed Oil was reacted with 184.3 g of maleic anhydride at 200° C. under a $N_2$ atmosphere for 3.5 hours and then cooled down to 108° C. An air sparge was initiated and 1.35 g of MEHQ and 3.4 g of Ankamine K54 were added. Then, 218 g of 2-hydroxyethylacrylate were added over 65 minutes and the reaction was held at 108° C. for 3 hours and 30 minutes.

An acrylated maleated linseed oil having the following properties was obtained:
viscosity (at 25° C.) 4560 cps, acid value=65, TAV=67, Color=12 Gardner.

Example 4

521.7 g of Refined Soybean Oil was reacted with 101.9 g of maleic anhydride at 200° C. under a $N_2$ atmosphere for 7.5 hours and then cooled down to 108° C. An air sparge was initiated and 0.74 g of MEHQ was added. Then, 120.7 g of 2-hydroxyethylacrylate were added over 70 minutes and the reaction was held at 108° C. for 5 hours and 30 minutes.

An acrylated maleated soybean oil having the following properties was obtained:
viscosity (at 25° C.) 4900 cps, acid value=73.2, TAV=72.5.

Example 5

529.5 g of Supreme Linseed Oil was reacted with 121.7 g of maleic anhydride at 200° C. under a $N_2$ atmosphere for 4 hours and then cooled down to 108° C. An air sparge was initiated and 0.80 g of MEHQ was added. Then, 144.1 g of 2-hydroxyethylacrylate were added over 120 minutes and the reaction was held at 108° C. for 3 hours and 40 minutes.

An acrylated maleated linseed oil having the following properties was obtained:
viscosity (at 25° C.) 15920 cps, acid value=82.8, TAV=83.8, Color=7 Gardner.

Example 6

446.3 g of Refined Soybean Oil was reacted with 87.2 g of maleic anhydride at 200° C. under a $N_2$ atmosphere for 3 hours and then cooled down to 108° C. An air sparge was initiated and 0.64 g of MEHQ was added. Then, 103.3 g of 2-hydroxyethylacrylate were added over 60 minutes and the reaction was held at 108° C. for 5 hours.

An acrylated maleated soybean oil having the following properties was obtained:
viscosity (at 25° C.) 7355 cps, acid value=73.4, TAV=73.5.

Example 7

1750.5 g of Refined Soybean Oil was reacted with 342 g of maleic anhydride at 200° C. under a $N_2$ atmosphere for 4.5 hours and then cooled down to 108° C. An air sparge was initiated and 2.5 g of MEHQ was added. Then, 405 g of 2-hydroxyethylacrylate were added over 195 minutes and the reaction was held at 108° C. for 5.5 hours.

An acrylated maleated soybean oil having the following properties was obtained:
viscosity (at 25° C.) 5370 cps, acid value=72, TAV=71.5.

Example 8

521.7 g of Refined Soybean Oil was reacted with 101.9 g of maleic anhydride at 200° C. under a $N_2$ atmosphere for 4.5 hours and then cooled down to 108° C. An air sparge was initiated for 30 minutes and 0.75 g of THQ was added. Then, 120.7 g of 2-hydroxyethylacrylate were added over 50 minutes and the reaction was held at 108° C. for 5.5 hours.

An acrylated maleated soybean oil having the following properties was obtained:
viscosity (at 25° C.) 3850 cps, acid value=72.9, TAV=72.5, Color=6 Gardner.

Example 9

521.7 g of Linseed Oil was reacted with 101.9 g of maleic anhydride at 200° C. under a $N_2$ atmosphere for 4.25 hours and then cooled down to 108° C. An air sparge was initiated for 30 minutes and 0.75 g of THQ was added. Then, 120.7 g of 2-hydroxyethylacrylate were added over 55 minutes and the reaction was held at 108° C. for 6.5 hours.

An acrylated maleated linseed oil having the following properties was obtained:
viscosity (at 25° C.) 3935 cps, acid value=66.9, TAV=69, Color=13 Gardner.

Example 10

1752.4 g of Linseed Oil was reacted with 342.3 g of maleic anhydride at 200° C. under a $N_2$ atmosphere for 3.75 hours and then cooled down to 108° C. An air sparge was initiated for 30 minutes and 2.5 g of THQ was added. Then, 405.3 g of 2-hydroxyethylacrylate were added over 80 minutes and the reaction was held at 108° C. for 8.5 hours.

An acrylated maleated linseed oil having the following properties was obtained:
viscosity (at 25° C.) 5170 cps, acid value=71.5, TAV=71.6.

Example 11

1752.4 g of Supreme Soybean Oil was reacted with 342.3 g of maleic anhydride at 200° C. under a $N_2$ atmosphere for 6.5 hours and then cooled down to 108° C. An air sparge was initiated for 30 minutes and 2.5 g of THQ was added. Then, 405.3 g of 2-hydroxyethylacrylate were added over 135 minutes and the reaction was held at 108° C. for 3.6 hours. 2.44 g of THQ, 5.61 g of TPS and 6.1 g of oxalic acid were added.

An acrylated maleated soybean oil having the following properties was obtained: viscosity (at 25° C.) 4130 cps, acid value=75, TAV=76.1.

Example 12

1752.4 g of Supreme Soybean Oil was reacted with 342.3 g of maleic anhydride at 200° C. under a $N_2$ atmosphere for 6.5 hours and then cooled down to 108° C. An air sparge was initiated for 30 minutes and 2.5 g of THQ was added. Then, 405.3 g of 2-hydroxyethylacrylate were added over 135 minutes and the reaction was held at 108° C. for 7 hours. 2.50 g of THQ, 5.77 g of TPS and 6.26 g of oxalic acid were added.

An acrylated maleated soybean oil having the following properties was obtained:
viscosity (at 25° C.) 4350 cps, acid value=77.7, TAV=74.

Example 13

279.8 g of Supreme Soybean Oil was reacted with 54.6 g of maleic anhydride at 200° C. and 0.5 g of PTZ under a $N_2$ atmosphere for 6 hours and then cooled down to 108° C. An air sparge was initiated for 30 minutes and 0.4 g of THQ was added. Then, 64.7 g of 2-hydroxyethylacrylate were added over 50 minutes and the reaction was held at 108° C. for 5.5 hours. 0.32 g of THQ, 0.74 g of TPS and 0.80 g of oxalic acid were added.

An acrylated maleated soybean oil having the following properties was obtained:
viscosity (at 25° C.) 2855 cps, acid value=68.8, TAV=71.4.

Example 14

259.4 g of Supreme Soybean Oil was reacted with 50.7 g of maleic anhydride at 200° C. and 0.37 g of iodine under a $N_2$ atmosphere for 6 hours and then cooled down to 108° C. An air sparge was initiated for 30 minutes and 0.37 g of THQ was added. Then, 60.0 g of 2-hydroxyethylacrylate were added over 55 minutes and the reaction was held at 108° C. for 6 hours. 0.29 g of THQ, 0.67 g of TPS and 0.73 g of oxalic acid were added.

An acrylated maleated soybean oil having the following properties was obtained:
viscosity (at 25° C.) 15470 cps, acid value=69.7, TAV=68.3.

Example 15

784.7 g of Refined Soybean Oil was reacted with 153.3 g of maleic anhydride at 200° C. under a $N_2$ atmosphere for 6 hours and then cooled down to 108° C. An air sparge was initiated and 1.50 g of THQ was added. Then, 562 g of the acrylate ester $C_{12-14}$ alkyl glycidyl ether were added over 1 hour and 40 minutes and the reaction was held at 108° C. for 4 hours. 1.05 g of THQ, 2.42 g of TPS and 2.63 g of oxalic acid were added.

An acrylated maleated soybean oil having the following properties was obtained:
viscosity (at 25° C.) 888 cps, acid value=53, TAV=53.3.

Example 16

688.4 g of Refined Soybean Oil was reacted with 134.4 g of maleic anhydride at 200° C. under a $N_2$ atmosphere for 6 hours and then cooled down to 108° C. An air sparge was initiated and 1.25 g of THQ was added. Then, 427.3 g of neodecanoic acid, 2-hydroxy-3-[(1-oxo-2-propenyl)oxy] propyl ester were added over 1 hour and 15 minutes and the reaction was held at 108° C. for 4.5 hours. 0.83 g of THQ, 1.91 g of TPS and 2.08 g of oxalic acid were added.

An acrylated maleated soybean oil having the following properties was obtained:
viscosity (at 25° C.) 3730 cps, acid value=60, TAV=61.2.

Example 17

1757.3 g of Refined Soybean Oil was reacted with 341 g of maleic anhydride at 200° C. under a $N_2$ atmosphere for 6 hours and then cooled down to 108° C. An air sparge was initiated and 3.07 g of THQ was added. Then, 1022.4 g of the acrylate ester of $C_{8-10}$ alkyl glycidyl ether were added over 2 hours and 25 minutes and the reaction was held at 108° C. for 4 hours. An acrylated maleated soybean oil having the following properties was obtained:
viscosity (at 25° C.) 1400 cps, acid value=59, TAV=56.9.

Example 18

A composition was made by blending 195 g of the acrylated maleated linseed oil obtained in Example 3 with 25 g of sucrose benzoate for 2 hours at 100° C. and then, after 1 hour, cooling this mixture to 60° C. and adding 30 g of polyester acrylate commercialized under the name of EBECRYL®810.

The composition was then used to prepare a pigment dispersion according to the following formulation: 60 wt % of composition, 10 wt % propoxylated glycerol triacrylate and 30 wt % of pigment.

A UV-litho ink was then prepared by mixing 60 wt % of this pigment dispersion with 24 wt % of the composition, 4 wt % of tripropyleneglycol diacrylate, 4 wt % of talc and 10 wt % of photoinitiator.

The UV-litho ink was tested by measuring ink tack and misting on a Thwing-Albert Electronic Inkometer and printability on absorbent substrates was tested on a Ryobi 2800 CD duplicator. The results obtained are presented in Table 1.

As comparison, the results obtained with an ink made with a composition not comprising the polyester acrylate was presented.

Example 19

Similar to Example 18 a UV litho ink was prepared except that the composition was made as follows: 858 g of the acrylated maleated soybean oil obtained in Example 11 was blended with 110 g of sucrose benzoate for 2 hours at 100° C. After 2 hours, this mixture was cooled to 60° C. and 132 g of polyester acrylate commercialized under the name of EBECRYL®810 was added.

The UV-ink was tested as in Example 18. The results obtained are presented in Table 1.

As comparison, the results obtained with an ink made with a composition not comprising the polyester acrylate was presented.

TABLE 1

| Example | Ink tack (g-m at 1200 RPM, 90 F.) | Ink misting (Delta E) | Printability |
|---|---|---|---|
| 18 | 13.5 | 15.3 | Moderate: met target color density and print contrast. Make-ready and press clean-up OK |
| Comparative to example 18 not containing polyesteracrylate | 13.7 | 17.7 | Poor: ink to water balance problem, ink stripping on rollers. |
| 19 | 10.2 | 3.9 | Very good: met or exceed target color density and print contrast. Make-ready and press clean-up OK |
| Comparative to example 19 not containing polyesteracrylate | 11.0 | 7.3 | Marginal: tendency for ink emulsification |

The results show that the compositions according to the invention permit to obtain UV inks with low ink tack, low ink misting and good printability. In addition they permit to obtain good reactivity and pigment wetting. In addition, the ink obtained in Example 19 showed excellent lithographic printing, good reactivity and stability showing that the ink would be suitable to be used on UV litho presses.

Example 20

A composition was made as follows: 858 g of the acrylated maleated soybean oil obtained in Example 11 was blended with 110 g of hydrocarbon resin for 2 hours at 100° C. After 2 hours, this mixture was cooled to 60° C. and 132 g of polyester acrylate commercialized under the name of EBECRYL®810 was added.

A UV-litho ink was then prepared by mixing 32 wt % of a commercial pigment dispersion based on an epoxyacrylate with 49 wt % of the composition, 2 wt % of tripropylene diacrylate, 2 wt % of talc, 9 wt % of additives and 6 wt % photoinitiator.

The litho ink presented the following properties: moderate ink body, low ink tack, low ink misting, good reactivity, stability, pigment wetting and printability.

Example 21

Example 20 was repeated using 132 g of polyester acrylate commercialized under the name of EBECRYL®885 in stead of the polyester acrylate EBECRYL®810.

The litho ink presented the following properties: moderate ink body, low ink tack, low ink misting, good reactivity, stability, pigment wetting and printability.

Example 22

A composition was made as follows: 175.5 g of the acrylated maleated soybean oil obtained in Example 11 was blended with 110 g of hydrocarbon resin for 2 hours at 100° C. After 2 hours, this mixture was cooled to 60° C. and 27 g of epoxy acrylate commercialized under the name of EBECRYL®3700 was added.

A UV-litho ink was prepared as in Example 20.

The litho ink presented the following properties: high ink body, moderate ink tack, good reactivity, good stability and good lithographic printing.

Example 23

A composition was made as follows: 47 g of the acrylated maleated soybean oil obtained in Example 11 was blended with 21 g of polyester acrylate commercialized under the name of EBECRYL®870, 28 g of urethane acrylate commercialized under the name of EBECRYL®270 and 4 g of adhesion promoter commercialized under the name of EBECRYL®168.

A UV-litho ink was prepared as in Example 20.

The litho ink presented the following properties: good adhesion to metallic foils, good reactivity, water resistance and lithographic printing.

Example 24

A composition was made as follows: 47 g of the acrylated maleated soybean oil obtained in Example 11 was blended with 21 g of polyester acrylate commercialized under the name of EBECRYL®870, 28 g of urethane acrylate commercialized under the name of EBECRYL®4883 and 4 g of adhesion promoter commercialized under the name of EBECRYL®168.

A UV-litho ink was prepared as in Example 20.

The litho ink presented the following properties: good adhesion to metallic foils, good reactivity, water resistance and lithographic printing.

Example 25

A composition was made as follows: 180 g of the acrylated maleated soybean oil obtained in Example 11 was blended with 20 g of hydrocarbon resin for 2 hours at 100° C. Then 200 g of epoxy acrylate commercialized under the name of EBECRYL®3720TP25 was added.

An overprint varnish composition was prepared by mixing 80 g of this composition with 90 g of trimethylolpropane triacrylate and 15 wt % of photoinitiator.

The overprint varnish was tested and showed following properties: low viscosity (500 cP at 25° C.), good reactivity (100 mJ/cm$^2$ with 1-400 watts/inch lamp) and solvent resistance (30 MEK double rubs).

Example 26

Example 25 was repeated except that the hydrocarbon was omitted. The overprint varnish showed following properties: low viscosity (600 cP at 25° C.), good reactivity (100 mJ/cm$^2$ with 1-400 watts/inch lamp) and solvent resistance (20 MEK double rubs).

Examples 27 to 29

Example 18 was repeated, except that, respectively, the acrylated oils of Examples 15, 16 and 17 were used in stead of the acrylated maleated linseed oil of Example 3, were used.

The results obtained are presented in Table 2.

TABLE 2

| Example | Ink tack (g-m at 1200 RPM, 90 F.) | Ink misting (Delta E) | Printability |
|---|---|---|---|
| 27 | 9.1 | 16.2 | Moderate: some tendency for ink emulsification |
| 28 | 10.0 | 15.8 | Moderate: some tendency for ink emulsification |
| 29 | 9.5 | 18.1 | Moderate: some tendency for ink emulsification |

Example 30

A composition was made by blending 30 g of the acrylated oil of Example 14 with 35 g of dipropyleneglycol diacrylate (DPGDA), 25 g of calcium carbonate, 5 g of talc and 5 g of photoinitiator.

The composition was applied on oak and maple wood substrates as well an on steel panels with a #12 drawdown-bar and cured with 2H-lamps operated at 300 watts/inch. Surface cure required 500 mJ/cm$^2$ and through cure required 750-1000 mJ/cm$^2$. Adhesion on both the wood and the steel substrates was good; impact resistance was higher than 80 lb/inch.

Example 31

Example 30 was repeated except that a composition made by blending 30 g of the acrylated oil of Example 14 with 35 g of propoxylated glycerol triacrylate commercialized under the name of OTA 480, 25 g of calcium carbonate, 5 g of talc and 5 g of photoinitiator was used. The results obtained were similar than those in Example 30.

Examples 32 and 33

Examples 30 and 31 were repeated except that the acrylated maleated soybean oil of Example 15 was used in stead of the one of Example 14.

The resulting coatings were applied and cured as for the coatings of Examples 30 and 31. Results were similar except that through cure requires 2000 mJ/cm$^2$.

Examples 34 and 35 and Comparative Examples 36R and 37R

A composition was prepared by blending 30 g of resin as specified in Table 3 here below, 20 g of DPGDA, 10 g of the polyester acrylate EBECRYL®810, 30 g of calcium carbonate, 5 g of talc, 4.3 g of photoinitiator and 0.7 g of matting agent ACEMATT® TS 0.7.

The compositions were applied on maple wood and steel and cured. The properties obtained are presented in Table 3.

| | Example | | | |
|---|---|---|---|---|
| | 34 | 35 | 36R | 37R |
| Resin of | Example 14 | Example 16 | Epoxyacrylate EBECRYL ®600 | Polyester acrylate EBECRYL ®885 |
| Viscosity, cps (Brookfield, 25° C.) | 1200 | 900 | 3500 | 2700 |

-continued

| | Example | | | |
|---|---|---|---|---|
| | 34 | 35 | 36R | 37R |
| Cure energy mJ/cm2 | 1480 | >3000 | 237 | 296 |
| Reverse impact | >80 | 50 | <5 | 50 |
| Mandrel flexibility cm | 0 | 0 | 3 | 0 |
| Adhesion to steel % | 100 | 100 | 70 | 100 |
| Adhesion to maple wood % | 100 | 100 | 20 | 10 |

In comparison with commercial radiation curable oligomers EBECRYL®600 and EBECRL®885, the compositions comprising the acrylated maleated natural oils according to the invention exhibited superior flexibility and adhesion and lower application viscosity.

The invention claimed is:

1. A (meth)acrylated natural oil which is the reaction product of
an unsaturated natural oil with an unsaturated anhydride, and
a hydroxyl functional (meth)acrylate comprising a secondary hydroxyl group,
wherein the hydroxyl functional (meth)acrylate is a compound of formula (I) or (II)

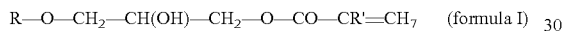

R—O—CH$_2$—CH(OH)—CH$_2$—O—CO—CR'=CH$_2$  (formula I)

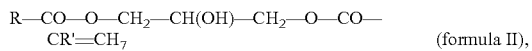

R—CO—O—CH$_2$—CH(OH)—CH$_2$—O—CO—CR'=CH$_2$  (formula II), wherein R' is H or —CH$_3$, and
wherein R=an alkyl or aryl comprising from 4 to 20 carbon atoms, and wherein the (meth)acrylated natural oil is obtained by a process wherein, in a first step, the unsaturated natural oil is reacted with the unsaturated anhydride, followed by a subsequent step wherein the anhydride modified natural oil is reacted with the hydroxyl functional (meth)acrylate.

2. The (meth)acrylated natural oil according to claim 1, wherein the unsaturated natural oil comprises soybean oil and/or linseed oil.

3. The (meth)acrylated natural oil according to claim 1, wherein the unsaturated anhydride comprises maleic anhydride.

4. The (meth)acrylated natural oil according to claim 1, wherein the hydroxyl functional (meth)acrylate comprises a hydroxyl alkyl(meth)acrylate.

5. A radiation curable composition comprising:
(a) from 1 to 99% by weight of the (meth)acrylated natural oil according to claim 1, and
(b) from 1 to 99% by weight of a (meth)acrylated oligomer and/or (meth)acrylated monomer other than (a).

6. The radiation curable composition according to claim 5 comprising:
(b) from 1 to 99% by weight of the (meth)acrylated oligomer, wherein the (meth)acrylated oligomer is selected from the group consisting of polyester (meth)acrylates, polyether (meth)acrylates, epoxy(meth)acrylates, urethane (meth)acrylates, (meth)acrylated (meth)acrylates, amine(meth)acrylates and combinations thereof.

7. The radiation curable composition according to claim 5 comprising:
(a) from 10 to 99% by weight of the (meth)acrylated natural oil according to claim 1.

8. The radiation curable composition according to claim 5 comprising:
(b) from 10 to 99% by weight of the (meth)acrylated oligomer,
wherein the radiation curable composition, optionally, further comprises from 0 to 60% by weight of (meth)acrylated monomers.

9. The radiation curable composition according to claim 5 comprising:
(a) from 20 to 99% by weight of the (meth)acrylated natural oil according to claim 1.

10. The radiation curable composition according to claim 5 further comprising from 1 to 50% by weight of an inert resin.

11. The radiation curable composition according to claim 5 further comprising from 1 to 50% by weight of filler.

12. A method of printing comprising at least one step wherein a substrate is printed with an ink or varnish comprising the (meth)acrylated natural oil according to claim 1, and curing the printed ink or varnish with actinic radiation or electron beams.

13. An entirely or partially coated or printed substrate, wherein the printing ink or coating material used comprises the (meth)acrylated natural oil according to claim 1.

14. A method of printing comprising at least one step wherein a substrate is printed with an ink or varnish comprising the radiation curable composition according to claim 5, and curing the printed ink or varnish with actinic radiation or electron beams.

15. An entirely or partially coated or printed substrate, wherein the printing ink or coating material used comprises the radiation curable composition according to claim 5.

* * * * *